(12) United States Patent
Pearson et al.

(10) Patent No.: US 6,873,698 B1
(45) Date of Patent: Mar. 29, 2005

(54) TELECOMMUNICATIONS NETWORK

(75) Inventors: Dennis Pearson, Wimborne (GB); Thomas Snape, Blandford (GB)

(73) Assignee: Marconi UK Intellectual Property Ltd., Coventry (GB)

( * ) Notice: Subject to any disclaimer, the term of this patent is extended or adjusted under 35 U.S.C. 154(b) by 0 days.

(21) Appl. No.: 09/720,667

(22) PCT Filed: Jul. 2, 1999

(86) PCT No.: PCT/GB99/02129

§ 371 (c)(1),
(2), (4) Date: Mar. 1, 2001

(87) PCT Pub. No.: WO00/02399

PCT Pub. Date: Jan. 13, 2000

(30) Foreign Application Priority Data

Jul. 3, 1998 (GB) .............................. 9814418

(51) Int. Cl.[7] .............................. H04M 7/00
(52) U.S. Cl. .............. 379/221.08; 379/201.03
(58) Field of Search ....................... 379/201.01, 201.02, 379/201.03, 201.05, 221.08, 221.09, 221.12, 230

(56) References Cited

U.S. PATENT DOCUMENTS

| | | | |
|---|---|---|---|
| 5,511,113 A | | 4/1996 | Tasaki et al. |
| 5,526,415 A | | 6/1996 | Wakamoto |
| 5,838,768 A | * | 11/1998 | Sumar et al. ............ 379/88.14 |
| 6,003,031 A | * | 12/1999 | Hartikainen et al. .......... 707/10 |
| 6,064,729 A | * | 5/2000 | Cookson .................... 379/230 |
| 6,115,746 A | * | 9/2000 | Waters et al. ............... 709/229 |
| 6,175,618 B1 | * | 1/2001 | Shah et al. ............ 379/207.13 |

FOREIGN PATENT DOCUMENTS

| | | |
|---|---|---|
| EP | 0 726 682 A2 | 8/1996 |
| WO | WO 95/29564 | 11/1995 |
| WO | WO 97/36430 | 10/1997 |

OTHER PUBLICATIONS

*Rapid Service Delivery and Customization in a Developing Network Infrastructure*, P.S. Richards, Computer Networks and ISDN Systems 25 (1993) pp. 1031–1039.

* cited by examiner

*Primary Examiner*—Bing Q. Bui
(74) *Attorney, Agent, or Firm*—Kirschstein, et al.

(57) ABSTRACT

A telecommunications system comprising an intelligent network (IN) for providing IN and non-IN service creation environment function (SCEF) in which the SCEF is arranged to provide service logic and service data templates for supporting both IN and non-IN services. The service logic provided by the SCEF may either be distributed between the service control function (SCF), the service switching function (SSF) and the call control function (CCF) or located in the SCF with the SSF arranged to pass protocol input messages to the SCF and signaling messages from the SCF to the CCF.

13 Claims, 3 Drawing Sheets

TELECOMMUNICATIONS NETWORK

BACKGROUND OF THE INVENTION

The current invention relates to Telecommunications Networks and in particular to the provision of Intelligent Network and non-Intelligent Network Services.

ITU Recommendations (Q.1221; Q.1222; Q.1223; Q.1224; Q.1225; Q.1228) define a number of Intelligent Network functions and functional relationships. Current intelligent network (IN) architecture uses the service switching point (SSP) to converge IN and non-IN call and connection control. For exchange to exchange signalling, the call control uses ISDN user part (ISUP) and, in the UK, also national user part (NUP) as defined in standards BTNR 167 and ITU-T Q.761–764. From the view point of the SSP, the IN standards define: management of the interaction of IN and non-IN services in the SSP; a service creation environment for IN services; a defined intelligent network application protocol (INAP) for signalling between the service control function (SCF) and the service switching function (SSF); an abstract internal entity definition of SSF and call control function (CCF) functionality within the SSP; and an originating and terminating state machine defining the relationship between call and connection control and IN service logic control realized through the use of the INAP interface defined between the SCF and the SSP. However the exact relationship between SSF and CCF is not defined in the standards.

WO-A-97 36430 assigned to British Telecommunications plc, describes a conventional intelligent network in which IN services are created in a service creation environment whereas non-IN services are not created in the service creation environment.

In intelligent networks service logic and data templates for supporting new services are created in the service creation environment function (SCEF). Current IN architecture definitions provide no single unified process in the SCEF for the definition of IN and non-IN service logic and service data inter-acting in a coherent manner.

SUMMARY OF THE INVENTION

By using the present invention it is possible to provide a more efficient and precise method of defining and deploying IN and non-IN services.

The present invention provides a telecommunications system comprising an intelligent network (IN) for providing IN and non-IN services and comprising a service creation environment function (SCEF), characterised in that the SCEF is arranged to provide service logic for the IN for supporting both IN and non-IN services.

In a preferred embodiment of the invention the telecommunications system comprises a service control function (SCF), a service switching function (SSF) and a call control function (CCF) in which the IN and non-IN service logic is distributed between the SCF, SSF and CCF.

In a further preferred embodiment of the invention the telecommunications system comprises a service control function (SCF) and a service switching point (SSP), the SSP comprising a call control function (CCF) and a service switching function (SSF) in which the IN and non-IN service logic is located in the SCF and in which the SSP is arranged to pass some or all protocol input messages received by the SSP to the SCF and some or all signalling messages originating in the SCF to the CCF for output.

The present invention also provides a telecommunications system comprising an intelligent network (IN) for providing IN and non-IN services and comprising a service creation environment function (SCEF) characterised in that the SCEF is arranged to provide data structures for the IN for supporting both IN and non-IN services.

BRIEF DESCRIPTION OF THE DRAWINGS

Embodiments of the invention will now be described by way of example with reference to the figures in which.

DETAILED DESCRIPTION OF THE PREFERRED EMBODIMENTS

Figure 1:
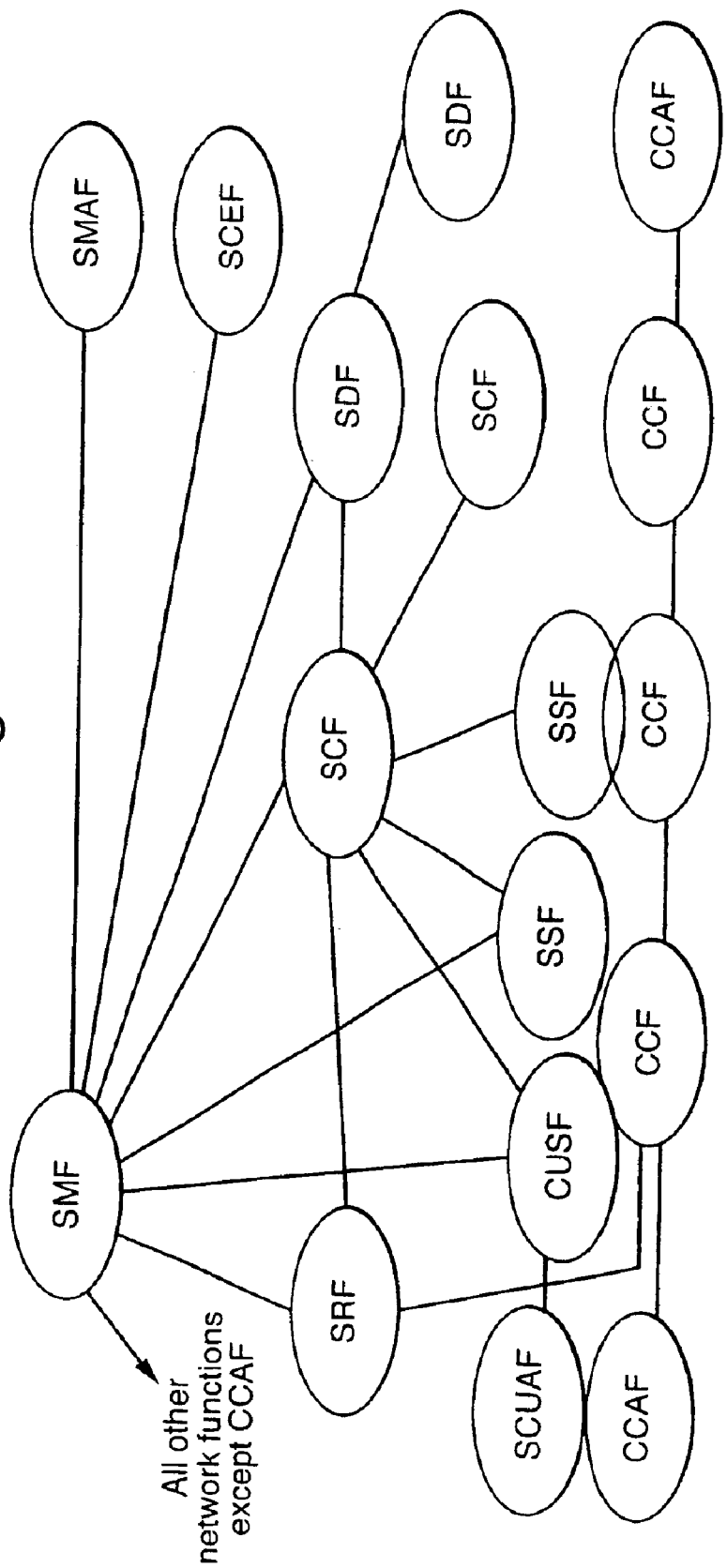
FIG. 1 shows in diagrammatic form the elements of a telecommunications system including an intelligent network according to the prior art.

In a conventional network as shown in FIG. 1 the SCEF creates service logic for deployment by the service management function (SMF). FIG. 1 depicts the Intelligent Network functions and relationships as defined in the current standards. Note that there is no direct relationship shown between:

the SCF and CCF (although there is one through the SSF);
the SMF and CCF (although there is one through the SSF); or the SDF and the SSF or CCF.

Intelligent Network Capability Set-2 (IN CS-2) is the second standardized stage of the Intelligent Network (IN) as an architectural concept for the creation and provision of services, including telecommunication services, service management services and service creation services. Call/service processing for IN CS-2 builds upon the call processing infrastructure of existing digital exchanges. It does so by using a generic model of existing call control functionality to process basic two-party calls, then adding service switching functionality to invoke and manage IN service logic. Once invoked, IN service logic is executed under the control of the service control function (SCF), in conjunction with the service data function (SDF). With this distributed approach to call/service processing, the existing call control function retains ultimate responsibility for the integrity of calls, as well as for the control of call processing resources.

The current definition of IN CS-2 imposes a number of call/service processing conditions as described in the following paragraphs:

(a) Call control and service switching functionality are tightly coupled, and the relationship between SSF and CCF is not standardized in IN CS-2: therefore no open interface exists between them.

(b) A call is either between two or more end users that are external to the network (and addressable via a directory number or combination of directory number and bearer capability), or between one or more end users and the network itself.

(c) A call may be initiated by an end user, or by a SCF within the network on behalf of an end user. To supplement a call, IN service logic may be invoked either by an end user served by an IN exchange, or by the network on behalf of an end user.

(d) A call may span multiple exchanges. As such, each exchange only controls the portion of the call in that exchange—call processing is functionally separated between exchanges. IN service logic invoked on SSPs in such an inter-exchange call is managed independently by each SSP.

(e) Existing exchanges can be viewed as having two functionally separate sets of call processing logic that coordinate call processing activities to create and maintain a basic two-party call. This functional separation is provided between (i) the originating portion of the call and (ii) the terminating portion of the call. This functional separation should be maintained in an IN exchange to allow IN service logic invoked on the originating portion of the call (i.e. on behalf of the calling party) to be managed independently of IN service logic invoked on the terminating portion of the call (i.e. on behalf of the called party).

(f) It is desirable to allow multiple IN-supported service logic instances to be simultaneously active for a given end user. It is also recognized that non-IN service logic will continue to exist in the network. As such, IN CS-2 mechanisms for providing service feature logic instances should:
determine which service logic to invoke for a given service request. This mechanism should select the appropriate IN service logic or non-IN service logic and block the invocation of any other service logic for that particular service request;
limit simultaneously active IN and non-IN service logic instances;
ensure that simultaneously active IN service logic instances adhere to the single-ended, single point of control restriction on IN CS-2 service processing, i.e. an SSF never has to inter-act with more than one SCF at any one time.

(g) The distributed approach and added complexity of call/service processing for IN CS-2 requires mechanisms for fault detection and recovery, allowing graceful termination of calls and appropriate treatment for end users.

Figure 2:
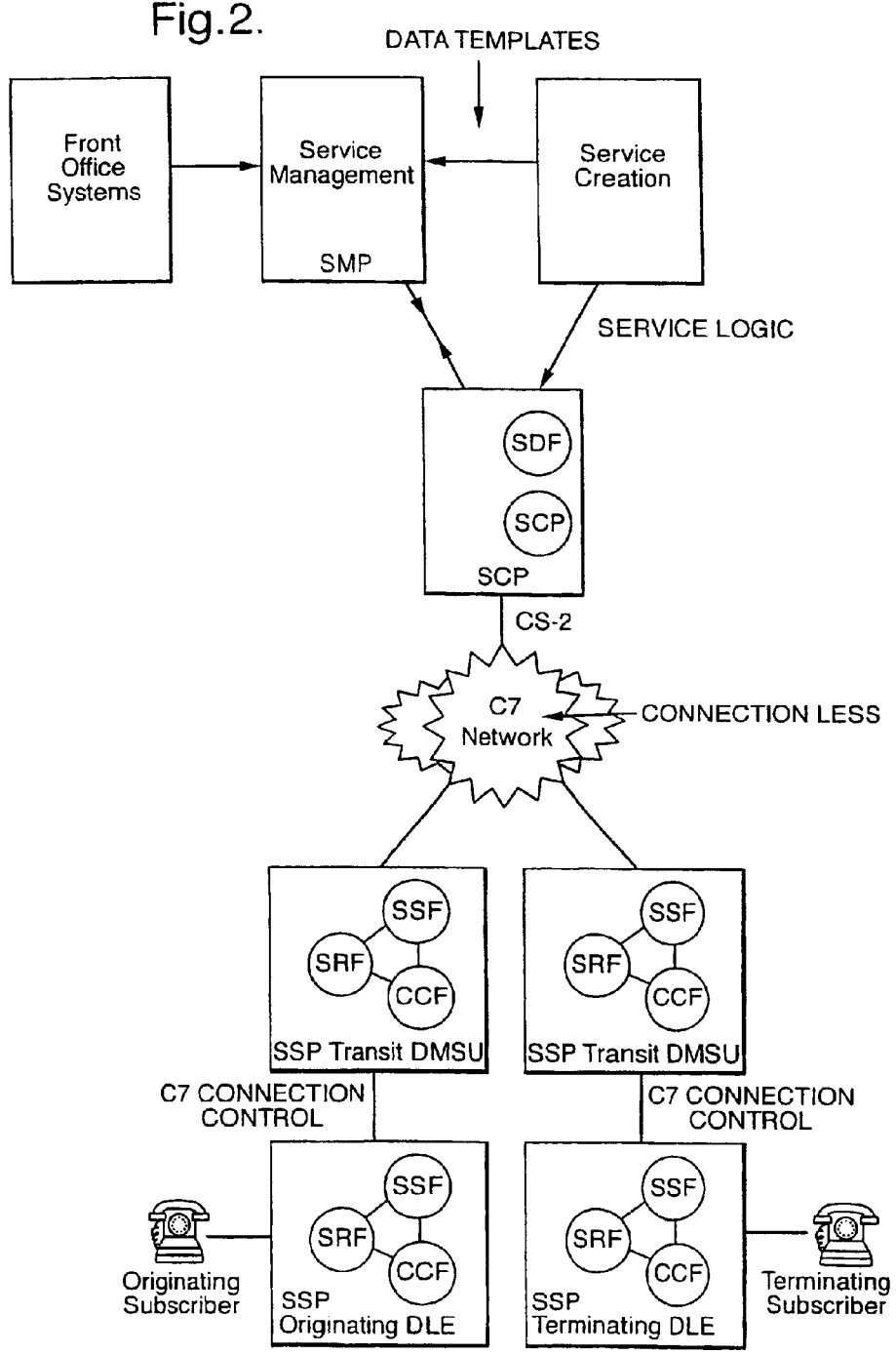
FIG. 2 shows in block diagram form a typical network of the prior art implementing an intelligent network.

A typical conventional network implementation of the Intelligent Network (IN) concept is shown in FIG. 2, which shows the IN elements interfacing with a Front Office System. The Call Control Function is provided by a number of co-operating CCFs which provide basic call and supplementary service control. This is provided in the originating and terminating local exchanges (Digital Local Exchange (DLE)) and in trunk exchanges (Digital Main Switching Unit (DMSU)). The IN provides limited control of the CCF via the SCF and the SSF using a standard signalling interface such as CS-2. This allows for single-point control over the routing of the connection between the originating and terminating subscribers for services such as Freephone, where translation of the destination number is performed at the SCP. Note that all IN services can be triggered at any of the local or trunk exchanges in the example shown in the figure.

In a conventional telecommunications network the call handling is provided in the CCF. When a user makes access to the telecommunications network, e.g. by initiating a telephone call, a call control chain is established from the caller via one or more CCFs to the destination. Various stages of the call control chain are set-up according to the standards for NUP, ISUP or access protocol ITU-T Q.931. These protocols define the messages and protocol information elements. Access protocol input messages are derived from the ISUP and Q.931 call control chain. Protocol information elements are defined in ISUP or Q.931 (e.g. calling line identity) or sent from the SCF as appropriate, dependent on the service requested. The call control chain from the CCF to other exchanges is therefore driven by messages defined by the appropriate network standard (NUP/ISUP) or access protocol (ITU-T Q.931).

According to Q.1221 the SCEF allows an intelligent network service to be defined, developed, tested and input to the SMF. To do this the SCEF outputs service logic and service data templates. The service management function, SMF provides service operation control, service provision control, service deployment control, service monitoring and maintenance. The SCF and SSF are responsible for the handling of interactions between IN based SSF/CCF capabilities and non-IN features already provided in (he basic network.

Figure 3:
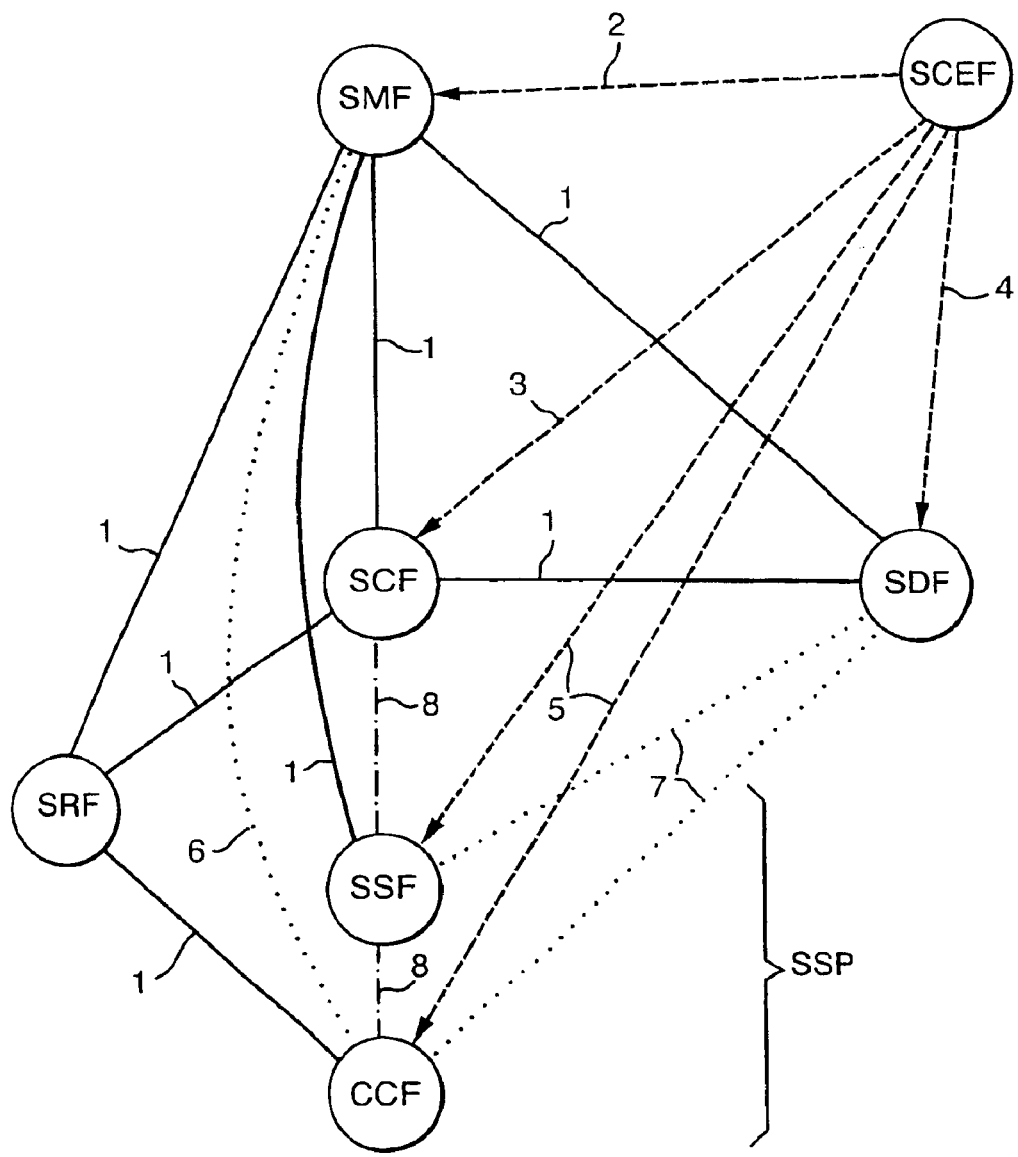
FIG. 3 shows in diagrammatic form an arrangement pertaining to a telecommunications system including an intelligent network according to the present invention.

FIG. 3 shows the various interfaces between the elements of a telecommunications system including an intelligent network according to the present invention.

In the prior art, interfaces 1 exist between CCF-SRF, SRF-SCF, SRF-SMF, SCF-SMF, SCF-SDF, SMF-SSF and SMF-SDF. In addition, in the prior art, the SCEF has means 2 for the deployment of management forms to the SMF, means 3 for the deployment of service logic and data templates to the SCF and means 4 for the deployment of service data templates to the SDF.

According to the embodiments of the invention described here, new interfaces 5 allow deployment of service logic and service data to the SSF and CCF. Further new interface 6 provide means for data population and management from the SMF to the CCF. Further new interfaces 7 provide direct access from the SSF and CCF to the SDF for service data Finally the existing interfaces 8 between SCF-SSF and SSF-CCF are enhanced according to a preferred embodiment of the invention described below.

Two embodiments of the invention will now be described by way of example, however the invention is not limited to these embodiments which only represent illustrations of two amongst a multitude of possible arrangements that fall within the scope of the invention. In particular, the distribution of service logic and service data amongst the elements referred to above is not limited to those described in the embodiments. Elements from each embodiment may be combined to form further arrangements according the present invention. In both embodiments the SCEF produces service logic to control the call control chain between exchanges and any functional response to the protocol used to invoke services.

According to a first embodiment of the invention the SCEF is used to provide service logic, both IN and non-IN, distributed between the SCF and SSF/CCF. In order to achieve the above the SCEF is enhanced to allow service logic and associated data structures to be created and loaded into the CCF as well as the SCF and SSF for both IN and non-IN service control. In addition, the CCF is enhanced to allow it to be loaded with service logic and service data, e.g. from the SMF or man-machine interface (MMI), to interact with the SCF via the SSF using messages, operations and parameters defined using the SCEF, and to create a relationship between the CCF and the service data function (SDF). In this instance, the CCF will access the SDF directly for service data.

According to a second embodiment of the invention the SCEF is used to provide service logic, both IN and non-IN, residing in the SCF with only a minimal amount of service logic required in the SSF and CCF. The SSP is arranged to send all or some protocol input messages to the SCF and, in addition, all or some signalling messages originating in the SCF are sent out by the SSF/CCF. Basic control of internal resources is still done by the CCF. The signalling messages originated by the SCF include NUP, ISUP or Q.931 messages and parameters for onward transmission and are enveloped by the SSF with a CS-2 envelope. These functions are supported by the SCEF which is enhanced to allow the definition of messages, operations and parameters for transfer between the SCF and the CCF (relayed by the SSF) for control of both IN and non-IN services. In addition, the SSF is enhanced to allow the transparent passage of messages between the SCF and CCF for both call related and call unrelated activities and a relationship is established between the SSF, the CCF and the SCF. In this instance, the SSF acts as a relay between the SCF and CCF.

The present invention advantageously allows the service developer to specify the way in which IN and non-IN services interact and to load appropriate service logic into the CCF to allow all subscriber service profiles (part of the service data) to be held on the SCF or SDF or distributed as required so as to control the behaviour of the call control chain to provide IN and non-IN services. An example of this control would be to invoke functionality in distant telecommunications exchanges via communication using NUP or ISUP messages (e.g. invoking Ring-Back-When-Free in a second exchange when the desired called party is already using the telephone). The data elements (static and dynamic data which define telecommunications services established for the subscriber) have a relationship defined by the service creation process in the SCEF. The present invention allows the SMF to load the SCF, SSF and CCF with the appropriate service logic and service data to provide the IN non-IN services in a coherent manner and allow the SCF to send the ISUP or NUP protocol information element via the SSF/CCF to the distant exchange and invoke RBWF, if the subscriber has this service.

What is claimed is:

1. A telecommunications system, comprising: an intelligent network (IN) for providing IN and non-IN services; and a service creation environment function (SCEF) arranged to provide service logic for providing a service for the IN for supporting both the IN and non-IN services.

2. The telecommunications system of claim 1, and comprising a service control function (SCF), a service switching function (SSF), and a call control function (CCF), and means for distributing the IN and non-IN services between the SCF, SSF and CCF.

3. The telecommunications system of claim 2, in which the SCEF is also arranged to provide data structures in the CCF.

4. The telecommunications system of claim 3, in which the data structures comprise data structures for both the IN and non-IN services.

5. The telecommunications system of claim 3, and comprising a service data function (SDF), in which the CCF is arranged to access the SDF directly for service data.

6. The telecommunications system of claim 1, and comprising a service control function (SCF), a service switching function (SSF), and a call control function (CCF), in which the SCEF is arranged to provide the IN and non-IN service logic in the SCF, the SSF and the CCF.

7. The telecommunications system of claim 1, and comprising a service control function (SCF) and a service switching point (SSP), the SSP comprising a call control function (CCF) and a service switching function (SSF), in which the SCEF is arranged to provide the IN and non-IN service logic in the SCF, and in which the SSP is arranged to pass some or all protocol input messages received by the SSP to the SCF and some or all signalling messages originating in the SCF to the CCF.

8. The telecommunications system of claim 7, in which the SCF is arranged to perform some or all of the functions previously performed by the SSF and the CCF.

9. The telecommunications system of claim 7, in which the SCEF is arranged to support a definition of messages, operation and parameters for transfer between the SCF and the CCF.

10. The telecommunications system of claim 1, in which the SCEF is also arranged to provide data structures for both the IN and non-IN services.

11. The telecommunications system of claim 1, and comprising a call control function (CCF), in which the SCEF is also arranged to provide data structures in the CCF.

12. The telecommunications system of claim 1, and comprising a call control function (CCF) arranged to allow loading of data structures in the CCF from a service management function (SMF).

13. A telecommunications system, comprising: an intelligent network (IN) for providing IN and non-IN services; and a service creation environment function (SCEF) arranged to provide data structures for providing data communication for the IN for supporting both the IN and non-IN services.

* * * * *